United States Patent

Crane

[15] 3,663,958
[45] May 16, 1972

[54] VOLTAGE MONITORING DEVICE HAVING A PAIR OF DIFFERENTIAL AMPLIFIERS

[72] Inventor: Harold E. Crane, Resco Inc., 805 Central Avenue, New Orleans, La. 70121

[22] Filed: June 24, 1970

[21] Appl. No.: 49,491

[52] U.S. Cl. ............................ 324/133, 317/31, 340/248 A
[51] Int. Cl. .................................. G01r 19/14, G08b 21/00
[58] Field of Search ................... 324/133; 340/248 A, 248 B, 340/248 C; 317/31, 33

[56] References Cited

UNITED STATES PATENTS

| | | | |
|---|---|---|---|
| 3,354,448 | 11/1967 | Brolin | 340/248 |
| 3,457,560 | 7/1969 | McKinley | 340/248 |
| 3,317,747 | 5/1967 | Bryant | 324/133 UX |
| 3,311,907 | 3/1967 | Teal | 340/248 |
| 3,341,748 | 9/1967 | Kammiller | 340/248 C UX |

*Primary Examiner*—Edward E. Kubasiewicz
*Attorney*—Clarence A. O'Brien and Harvey B. Jacobson

[57] ABSTRACT

The output of an electrical power source is continuously monitored by voltage comparing circuits to which a reference voltage is applied through a low impedance driver. The reference voltage is compared with adjustably reduced values of the variable voltage of the source being continuously sampled to establish upper and lower voltage limits. When these limits are exceeded, a resettable alarm circuit is triggered into operation.

9 Claims, 2 Drawing Figures

Patented May 16, 1972
3,663,958
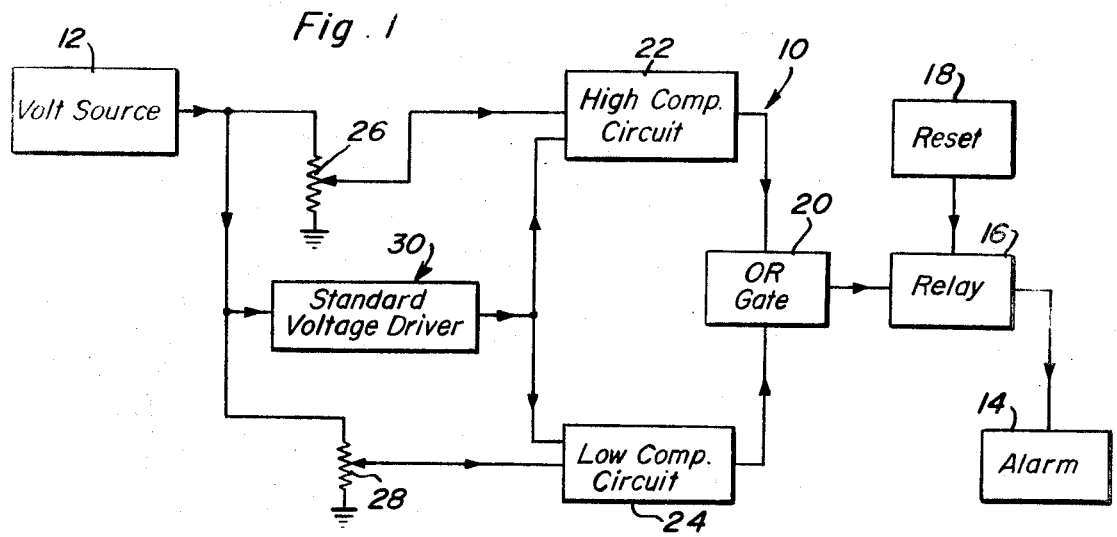
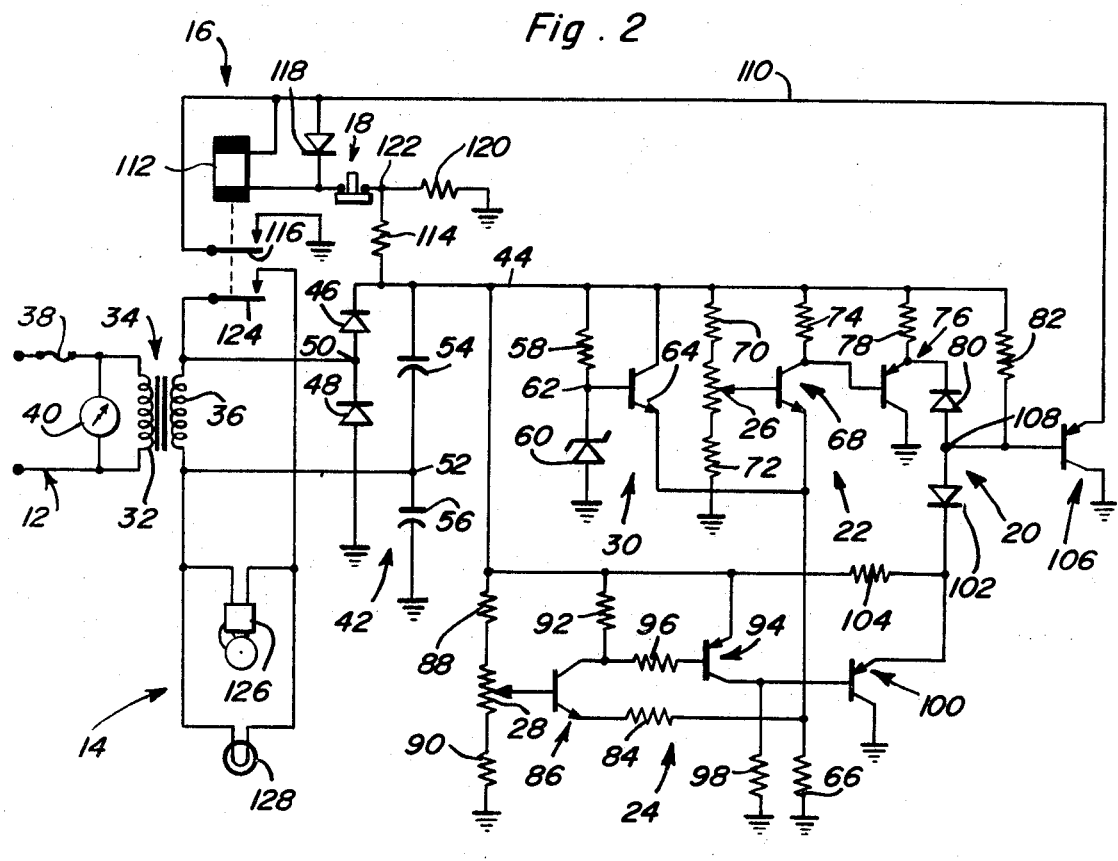
Harold E. Crane
INVENTOR.

VOLTAGE MONITORING DEVICE HAVING A PAIR OF DIFFERENTIAL AMPLIFIERS

This invention relates to the monitoring of an electrical power source so as to provide an alarm in the event an undervoltage or an overvoltage condition arises.

In connection with electrical equipment operated by its own power plant in isolated and remote locations, it is extremely important that the output power be continuously and reliably monitored and a timely warning of either undervoltage or overvoltage conditions provided in order to prevent damage of the electrical equipment. A monitoring circuit is required for this purpose which will sense both undervoltage and overvoltage without being affected by temperature changes.

It is therefore an important object of the present invention to provide a voltage monitoring circuit capable of continuously monitoring a power source with reliability and yet requiring a minimum amount of maintenance. An additional object is to provide such a voltage monitoring circuit with means for selectively adjusting the same to obtain desired upper and lower voltage limits.

Yet another object of the invention is to provide a voltage monitoring circuit which will trigger an alarm as soon as a voltage limit is exceeded, the alarm remaining on until manually reset in order to insure that the attention of supervisory personnel has been achieved.

In accordance with the present invention, the output voltage of an A.C. power source is converted into a D.C. voltage monitored by a pair of voltage comparison circuits through which upper and lower voltage tolerance limits are set by adjustable potentiometers feeding input signal voltages from the D.C. voltage line to voltage comparing amplifiers to which a reference voltage is fed from a common voltage driver. The voltage driver and the amplifiers in the voltage comparing circuits form differential amplifiers related to each other by a common emitter resistor by virtue of which temperature changes do not affect the circuits. When the limits established by the two voltage comparing circuits is exceeded, an output signal is produced and fed to an OR gate in order to trigger an alarm circuit. A manual reset switch opens the alarm circuit in order to terminate operation thereof if the undervoltage or overvoltage condition no longer exists.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a schematic block diagram illustrating the voltage monitoring system of the present invention.

FIG. 2 is an electrical circuit diagram showing the details of the voltage monitoring system.

Referring now to the drawings in detail, FIG. 1 diagrammatically illustrates the voltage monitoring system generally denoted by reference numeral 10 adapted to continuously monitor an electric power source 12 that may produce a power output characterized by a variable voltage. When the output voltage of the source 12 exceeds either an upper or a lower limit that could possibly damage electrical equipment operated therefrom, the voltage monitoring system 10 is operative through a common indicating alarm 14 to alert supervisory personnel. The alarm 14 is triggered into operation through a relay component 16 so that its operation may be manually terminated through a reset control 18 if the undervoltage or overvoltage condition no longer exists. Thus, an alarm triggering signal is fed to the relay component 16 through an OR gate 20 receiving output signals from either a high voltage circuit section 22 or a low voltage circuit section 24. The output voltage of the source 12 is continuously sampled by the circuit sections 22 and 24 through adjustable potentiometers 26 and 28 through which the upper and lower voltage tolerance limits are manually set. A reference voltage is also fed to the circuit sections 22 and 24 from a standard voltage driver 30 connected to the volt source 12.

Referring now to FIG. 2, the volt source 12 which may be nominally a 115 V.A.C. supply is connected across the primary winding 32 of a voltage stepdown transformer 34 having a secondary winding 36. One side of the primary winding is connected to the volt source through a fuse 38 while a meter 40 is connected across the terminals of the primary winding in order to monitor the condition of the fuse or the power lines to the transformer. In one embodiment of the invention, the 115 V.A.C. input to the transformer is reduced to 12.6 V.A.C. across the secondary winding which is connected to a voltage doubling rectifier circuit generally denoted by reference numeral 42 by means of which a D.C. voltage of approximately 30 volts is applied to a D.C. voltage line 44. The rectifier circuit 42 includes a pair of diodes 46 and 48 connected in tandem between ground and the voltage line 44 with the junction 50 therebetween being connected to one side of the secondary winding 36 of transformer 34, the other side of the secondary winding being connected to the junction 52 between a pair of filter capacitors 54 and 56 respectively connected to the voltage line 44 and ground. Breakdown of any of the diode or capacitor components of the rectifier circuit 42 will be operative to increase the current to the primary winding of the transformer 34 so as to blow the fuse 38.

The D.C. voltage line 44 is connected through the resistor 58 to a grounded Zener diode 60 by means of which a stable reference voltage of 12 V.A.C., for example, is established at the junction 62 connected to the base of an NPN type transistor 64 disposed in an emitter follower arrangement for driving the voltage comparing circuit sections 22 and 24. The collector of the transistor 64 is accordingly connected to the voltage line 44 while its emitter is connected to a common grounded emitter resistor 66 controlling the transistor switching level.

The high voltage comparing circuit section 22 also includes an NPN type of transistor 68 having an emitter directly connected to the emitter of transistor 64 of the voltage driver so as to form a differential amplifier and thereby compare the reference voltage supplied thereto from the driver through the emitter with a reduced D.C. version of the variable voltage supplied from the source to the voltage line 44. Accordingly, the input base of the transistor 68 is connected to the manually adjustable arm of the potentiometer 26 aforementioned which is connected between the resistors 70 and 72 in a voltage dividing network connected between ground and the D.C. voltage line 44. The collector of transistor 68 is connected through the load resistor 74 to the D.C. voltage line so that the transistor is normally in a non-conducting state with the input voltage to its base being below the reference voltage value of 12 volts, for example. In the non-conductive state of transistor 68, the output collector will be held at a relatively high cut-off value such as 30 volts applied to the base of a PNP type transistor 76 which is thereby held in a non-conductive state with its emitter connected to the voltage line through the load resistor 78 held at a relatively high positive voltage of 30 volts blocked at the diode 80 of the OR gate 20. The collector of transistor 76 is grounded.

When the voltage on line 44 rises above an upper tolerance limit set by the potentiometer 26, transistor 68 is forwardly biased to a conductive state causing the voltage at its output collector to drop below cut-off value for the base of transistor 76 so that transistor 76 is switched to a conductive state causing its output emitter to drop to a low value such as 12 volts. The diode 80 will be rendered conductive by the voltage applied thereto from the voltage line 44 through resistor 82 in order to conduct an output signal from the circuit section 22. The transistor 76 prevents loading of the transistor 68 and provides a low impedance path for the output signal.

The output emitter of the driver transistor 64 is also connected through a voltage reducing resistor 84 to the input emitter of transistor 86 in the low voltage comparing circuit section 24 having an input base connected to the potentiometer 28 through which the voltage in line 44 is continuously sampled as in the case of the circuit section 22. Thus, the potentiometer 28 is connected between resistors 88 and 90 in a second voltage dividing network connected between the voltage line 44 and ground. The output collector of transistor 86 is connected through load resistor 92 to the voltage line 44 and together with the driver transistor 64 forms a differential amplifier for comparing the reference voltage with the continuously sampled voltage from voltage line 44, which is normally above the 12-volt standard as applied to the base of transistor 86 in order to render transistor 86 conductive. In the normally conductive state of transistor 86, its output collector will be at approximately 12 volts in order to supply a forward bias voltage to the base of inverter transistor 94 through coupling resistor 96. The emitter of the NPN type transistor 94 is directly connected to the D.C. voltage line 44 while its output collector is maintained above ground potential by load resistor 98, in order to maintain the collector at approximately 30 volts while the transistor 94 is in a conductive state. This high cut-off voltage at the collector of transistor 94 is applied to the base of a driver transistor 100 of the PNP type having a collector connected to ground and an output emitter connected to the diode 102 of the OR gate. The output emitter of transistor 100 is loaded by resistor 104 connected between the emitter and the D.C. voltage line 44 in order to provide a low impedance path between ground and diode 102 when an output signal is produced from the low voltage comparing circuit section 24.

When the voltage in voltage line 44 falls to the low voltage tolerance limit, as set by the potentiometer 28, normally conducting transistor 86 is cut off so that the voltage at its collector rises to a high enough cut-off value such as 30 volts in order to switch off transistor 94. This reduces the voltage on the base of transistor 100 causing it to conduct and thereby reduces the voltage normally preventing the diode 102 from conducting.

It will be apparent that when an overvoltage or an undervoltage condition occurs exceeding the voltage limits established in the circuit sections 22 and 24, either one of the output signals is conducted through the OR gate 20 in order to forwardly bias the relay driving power transistor 106 having a base connected to the junction 108 between the diodes 80 and 102. The collector of transistor 106 is connected to ground and its output emitter is connected through conductor 110 to one terminal of relay coil 112 in the relay component 16. The other terminal of the relay coil is connected through the normally closed reset switch 18 and resistor 114 to the voltage line 44, in order to complete an energizing circuit when the transistor 106 is switched to a conductive state. When the relay coil 112 is energized, a normally open relay holding switch 116 is closed in order to complete a ground circuit bypassing the circuit through the driver transistor 106 in order to hold the relay coil energized. A diode 118 is connected across the terminals of the relay coil in order to prevent unintentional energization of the relay. Once the relay is energized and held energized by closing of the holding switch 116, it may be deenergized if no undervoltage or overvoltage condition exists by manually opening the reset switch 18 thereby disconnecting the relay coil from the voltage line 44 through resistor 114. A grounded bleed resistor 120 is connected to the junction 122 between the resistor 114 and the reset switch.

Upon energization of the relay coil 112, a normally opened relay switch 124 is also closed in order to connect an audible sounding device 126 and a visual indicator lamp 128 of the alarm component 14 across the secondary winding of transformer 24 in order to alert supervisory personnel. As hereinbefore indicated, the sounding device 126 and indicator lamp 128 will remain energized through the relay component whenever triggered into operation by an undervoltage or an overvoltage signal and must be off by manual opening of the reset switch 18.

It will be apparent from the foregoing description that the voltage monitoring and alarm circuit of the present invention is unique in that it utilizes a common indicator or alarm 14 for both undervoltage and overvoltage signals supplied thereto through an OR gate 20 from high and low voltage comparing circuit sections 22 and 24 each of which includes an amplifier transistor 68 or 86 differentially related to a common driver transistor 64 in order to effect both the high and low voltage measurements. Also, because the common emitter resistor 66 is utilized for the two voltage comparing transistors 68 and 86 and the reference voltage driver, the voltage measurements are not affected by temperature changes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A voltage monitoring circuit connected to a source of variable voltage comprising a D.C. voltage line, a pair of voltage comparing circuit sections connected to said voltage line, each of said circuit sections including a voltage dividing network having an adjustable potentiometer, an amplifier transistor having a base connected to the potentiometer, an output collector and an input emitter and a signal transmitting transistor having an input base and an output emitter, one of said circuit sections further including inverter means connecting the output collector of the amplifier transistor to the input base of the signal transmitting transistor for developing an undervoltage signal, the output collector of the amplifier transistor in the other of the circuit sections being directly connected to the input base of the signal transmitting transistor for developing an overvoltage signal, an OR gate connected to the output emitters of said signal transmitting transistors for conducting said undervoltage or overvoltage signals, alarm means connected to the OR gate for producing an alert in response to either of said signals, reference voltage establishing means connected to the voltage line, an emitter follower connecting the reference voltage establishing means to the input emitter of one of the amplifier transistors, a voltage reducing resistor connecting the emitter follower to the input emitter of the other of the amplifier transistors and a common emitter resistor connected between ground and one of said input emitters and in series with said voltage reducing resistor.

2. In combination with a variable source of voltage, at least two voltage comparing circuits connected to said source for monitoring the same, gate means connected in common to said circuits for conducting output signals from either of the circuits, voltage driver means connected in common to the circuits to form a differential amplifier with each of the circuits, and means connecting the voltage driver means to the source for establishing a reference voltage against which the variable voltage of the source is measured in each of the voltage comparing circuits to produce said output signals therefrom when upper and lower voltage limits are exceeded by the variable voltage of said source.

3. The combination of claim 2 wherein each of said voltage comparing circuits includes a current conducting device having input, output and control elements, means connecting the input elements of the circuits to the voltage driver means for applying the reference voltage to the voltage comparing circuits, means connecting the output elements to the source for continuously sampling the variable voltage thereof, separate adjusting means connecting the source to the control elements for establishing said voltage limits beyond which the variable voltage causes switching of the current conducting devices between conductive and non-conductive states, and means for producing said output signals in response to said switching of the current conducting devices.

4. The combination of claim 3 wherein one of the current conducting devices is held in a non-conductive state and the other in a conductive state while the variable voltage of said source is between said voltage limits.

5. The combination of claim 4 including common indicator means connected to the gate means for registering the output signals from either of said voltage comparing circuits.

6. The combination of claim 5 including switching level control means connected in common to the current conducting devices and the voltage driver means for substantially eliminating the affect of temperature variations on the voltage limits established by the adjusting means.

7. The combination of claim 3 including switching level control means connected in common to the current conducting devices and the voltage driver means for substantially eliminating the affect of temperature variations on the voltage limits established by the adjusting means.

8. The combination of claim 1 including common indicator means connected to the gate means for registering the output signals from either of said voltage comparing circuits.

9. The combination of claim 1 including switching level control means connected in common to the voltage comparing circuit sections and the voltage driver means for substantially eliminating the affect of temperature variations on the voltage limits established by the adjusting means.

* * * * *